Jan. 5, 1954

G. E. NOPONEN 2,665,193

RED IRON OXIDE OF HIGH COLOR PURITY
AND PROCESS OF MAKING SAME
Filed Nov. 22, 1948

INVENTOR
GEORGE E. NOPONEN
by Carpenter, Abbott, Coulter & Kinney
Attorneys

Patented Jan. 5, 1954

2,665,193

UNITED STATES PATENT OFFICE 2,665,193

RED IRON OXIDE OF HIGH COLOR PURITY AND PROCESS OF MAKING SAME

George E. Noponen, White Bear, Minn., assignor to Minnesota Mining & Manufacturing Company, St. Paul, Minn., a corporation of Delaware Application November 22, 1948, Serial No. 61,334

9 Claims. (Cl. 23—200)

This invention is concerned with novel red iron oxide pigments having high color intensity and color purity (sometimes referred to herein simply as "purity"), and with methods for the preparation thereof. These pigment products are of such outstanding color value that they have proven effective in automotive finishes as replacement for the organic pigments previously considered essential for desired color intensity, particularly in the range of the darker reds or maroons. As compared to the organic colors, these new inorganic pigments have the advantage of permanently retaining their color value under prolonged exposure to sunlight, i. e. of being stable against fading. They are also more economical.

In contrast with red iron oxide pigments known prior to this invention, the novel products hereinafter to be more fully described and identified are composed of closely graded substantially spherical particles. All of the prior art red iron oxides of which I am aware have consisted of irregular, angular particles, as is apparent on microscopic examination. On the contrary, the particles of which my new pigments are composed are found on microscopic inspection to be spherical or substantially spherical, i. e. somewhere between true spheres and slightly elongated or egg-shaped bodies. Furthermore, the range of sizes of the individual spheres in a pigment mass produced in accordance with this invention may be held to within close tolerances; much closer than has previously been possible, particularly where angular and irregular pigment particles were concerned. As a consequence, my improved iron oxide pigments exhibit a degree of purity of color hitherto unobtainable with pigments of similar composition.

Some of the advantageous characteristics of my new red iron oxide pigment products will be further apparent on consideration of the drawings, in which.

Figure 4:
Figures 4-6 are copies of photomicrographs of three representative commercially available high quality iron oxide pigments made according to prior art methods.
Figure 5:
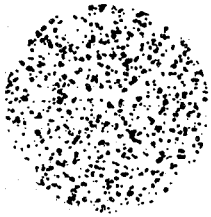
Figure 6:
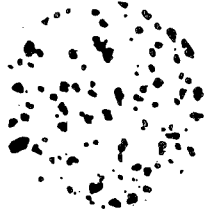
Figure 7:
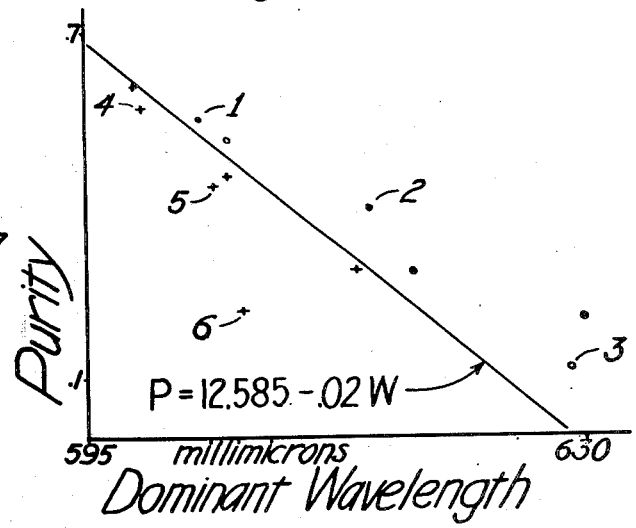
Figure 7 is a graphical representation of the color values of a number of representative iron oxide pigments including those of Figures 1-6, as determined spectrophotometrically.

It will be observed that my pigment masses consist of substantially spherical pigment particles (seen as circular or slightly elongated or egg-shaped discs in the photomicrographs) of substantially identical size, whereas the typical high quality prior art pigments represented in Figures 4-6 consist of blocky or angular particles covering, for any specific pigment mass, a considerable size range. These distinctions of particle shape and particle size distribution, obtained in my novel pigment product, are accompanied by equally outstanding distinctions in color characteristics, as shown by Figure 7.

It will be understood that, where reference is made to the color characteristics of the pigment, measurements of the purity, dominant wavelength, etc. are actually performed on lacquer compositions in which the color is provided by the pigment to be tested. Thus, in obtaining the data graphically presented in Figure 7, the pure iron oxide pigment was in each case incorporated in an automotive lacquer. The lacquer was then spray-coated on a panel, dried, and examined spectrophotometrically according to the method described by Professor A. C. Hardy; see his "Handbook of Colorimetry," published in 1936 by the Technology Press, Massachusetts Institute of Technology.

In this test only the pure inorganic pigment was employed. Other pigments, and in particular various organic colors, are frequently included in the pigment portion of lacquers or enamels, or the like, in order to improve or fortify the color. Such materials may, where desired, be used with the pigments of this invention. Organic colors may, for example, be precipitated on the surface of the pre-formed spherical particles; or the organic colors may be present during the formation of the spherical iron oxide particles; or they may be added separately to the lacquer composition. However, my novel oxide product is in many cases equal or superior in color values to fortified prior art iron oxide pigments or even the organic colors employed therein, and, in contrast to the organic colors, provides a much improved product with respect to non-fading under exposure to sunlight.

The composition of the lacquer was as follows:

| | |
|---|---|
| Pigment | 10 parts by volume |
| Nonvolatile vehicle | 90 |
| Thinner | Sufficient for desired consistency |

Composition of pigment:

Iron oxide pigment to be tested___percent__ 100

Composition of nonvolatile vehicle:

| | Parts by weight |
|---|---|
| One-half second nitrocellulose | 45 |
| Short oil non-drying alkyd ("Rezyl 99," a short oil non-drying alkyd made with cocoanut oil fatty acids) | 40 |
| Heavy blown castor oil | 10 |
| Dibutyl phthalate | 5 |

Composition of thinner:

| | Parts by weight |
|---|---|
| Toluene | 50 |
| Butyl acetate | 50 |

In preparing the lacquer, the pigment and all the nonvolatile vehicle constituents were placed in a one-gallon pebble mill half full of ½ inch porcelain balls. A weight of toluene equal to 25% of the total weight of pigment and vehicle was added and the mill run 10–15 minutes. A weight of butyl acetate equal to the weight of toluene was then added and the mill run for 1–2 hours, i. e. until the nitrocellulose and alkyd resin were completely dssolved. Thinner was then added to a viscosity of 140–145 Krebs units. The mill was then run for a total of 16 hours, and the lacquer completed by diluting with additional thinner to a viscosity of 25 seconds as measured on the Ford cup with a #4 orifice.

The lacquer was sprayed on metal panels in a thickness sufficient to give complete opacity or hiding.

The dried panels were analyzed by means of a spectrophotometer and the analytical data reduced to terms of purity and dominant wavelength. Figure 7 identifies the pigments of Examples 1–3 and three other oxides made in accordance with my invention; also Figure 7 identifies the pigments of Examples 4–6, as well as a few additional pigments selected to represent the highest color values and broadest range of colors known in prior art iron oxide pigments, in accordance with the values of color purity and dominant wave length thus obtained. It is seen that, for any given dominant wavelength, the purity of the color obtained with the products of this invention is much superior to that obtainable with previously known iron oxide pigments. A red iron oxide pigment product of any dominant wave length which has a color purity so that it will fall above the diagonal line shown in Figure 7 has, and is regarded herein as having, a high color purity.

It is also seen that this invention provides red iron oxide pigments having a range of dominant wavelengths never before obtained with iron oxides, namely, having a dominant wavelength greater than about 615 millimicrons.

In comparing my novel red iron oxide pigment products with the red iron oxide pigments produced by known prior art methods, I have found that points representing the relative color purity and dominant wavelength of such prior art pigments invariably fall well below the diagonal line of Figure 7, this line being defined by the equation $$P = 12.585 - .02W$$

where P represents "purity" (as defined by Professor Hardy, where the pure spectral color has a "purity" of unity), and W represents dominant wavelength in millimicrons. On the other hand, my novel iron oxide pigments are represented by points falling above such line, as shown in Figure 7.

Although mixtures of my pigment products, and mixtures of such pigments with other red iron oxide pigments, may have considerable utility, it will be apparent that the greatest advantages as regards "purity" and intensity of color are to be secured by employing these new materials undiluted and unadulterated. In some cases, the purity of color obtained with these preferred products has been of the order of that defined by the equation $$P = 8.435 - .013W$$

The spherical nature of the pigment particles and also the extreme degree of uniformity of particle size are both believed to contribute markedly to the "purity" and intensity of the observed color. Particles of different sizes are different in color characteristics, and the presence of appreciable proportions of particles of widely different size therefore results in diluted and "off-shade" pigment masses; this is avoided in my uniform particle size pigments. The spherical particles have an identical effect on incident light no matter from what direction it is transmitted, a property which is impossible to attain with any non-spherical particle. While I do not intend the above considerations to be limiting, yet the fact remains that red iron oxide pigments prepared according to my novel procedure and consisting of spherical particles having a high degree of particle size uniformity are also characterized by a hitherto unobtainable purity of color, as is illustrated in connection with Figure 7.

The photomicrographs of Figures 1–6 represent dispersions of the respective pigments in Canada balsam, spread on glass and photographed at a magnification of 1200. Suitable magnifications of these photographs were made, and the particle size distribution was determined through direct measurement of the effective diameter of the images of the randomly oriented particles. The diameter along a horizontal line dividing the particle image into equal areas was chosen as the effective diameter.

Figure 1:
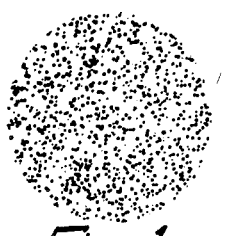
Figures 1-3 are copies of photomicrographs of three of my novel pigments having different shades of color.
Figure 2:
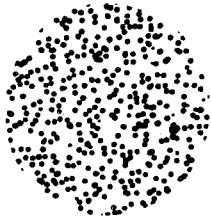
Figure 3:
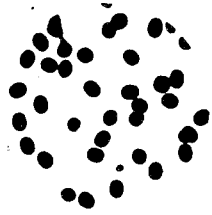

The uniformity of particle size obtained by my process is visually observable in Figures 1–3. It may also be expressed mathematically, based on the measurements of a large number of individual particles as above noted, by means of a particle size "coefficient of variation," C, which is a function of the average particle diameter and of the standard deviation from the average in a given sample. This coefficient, and the intermediate terms employed in its derivation, may be defined as follows:

$$C = \frac{\sigma}{D} \times 100$$

$$\sigma = \sqrt{\frac{\Sigma n v^2}{\Sigma n}} \times \frac{1}{10} \text{ (microns)}$$

$$D = \frac{\Sigma n s}{\Sigma n} \times \frac{1}{10} \text{ (microns)}$$

$$v = 10D - s$$

where $C$ = coefficient of variation
$n$ = frequency of occurrence
$s$ = particle size (measured effective diameter of the image in millimeters, at a magnification of 10,000)

As an example, the coefficient for the pigment of Figure 1 was obtained by measuring to the nearest millimeter, at a magnification of 10,000, a total of 1138 particles and calculating as shown in the table below.

TABLE

| s | n | ns | v | v² | nv² |
|---|---|---|---|---|---|
| 2 | 107 | 214 | 1.55 | 2.40 | 257.0 |
| 3 | 390 | 1,170 | .55 | .303 | 118.2 |
| 4 | 550 | 2,200 | -.45 | .203 | 111.7 |
| 5 | 80 | 400 | -1.45 | 2.10 | 168.0 |
| 6 | 10 | 60 | -2.45 | 6.00 | 60.0 |
| 7 | 1 | 7 | -3.45 | 11.90 | 11.9 |
| Σ= | 1,138 | 4,051 | | | 726.8 |

Results: $D=.355$ microns; $\sigma=0.08$ microns; $C=22.5$.

Similarly, the coefficient of variation C for the pigments of Figures 2 and 3 was found to be 9.6 and 10.9 respectively. Other pigments made by my improved process and similarly analyzed have given values for C well within this range, i. e. below a C value of about 25, and, particularly in the case of the preferred darker shades, below a C value of about 15. On the contrary, each of a number of representative prior art red iron oxide pigments tested has been found to have a coefficient of variation much greater than these values. For example, those of Figures 4-6 were found to have C values of 33.7, 47.5, and 60.4 respectively.

As hereinabove noted, this high degree of particle size uniformity in my pigments, represented by a coefficient of variation of not greater than about 25, or, preferably, not greater than about 15, is an important factor in obtaining the high degree of purity of shade and intensity of color found in such pigments, and enhances their usefulness as coloring agents.

While my red iron oxide product is particularly valuable as a pigment, for imparting color to paints, lacquers, enamels, resinous and plastic masses, ceramic glazes, and other products, its uniform particle size and spherical particle shape also provide for its advantageous application as a chemical raw material and in many other fields of utility.

My preferred procedure in making red iron oxide pigment products, having the novel properties and characteristics herein identified, includes the steps of forming a slurry of precipitated hydrous ferric oxide and of heating the slurry to promote the ageing of the hydrous oxide to a pigment product. It is important in this procedure to maintain the free ferric chloride present in the slurry of precipitated hydrous ferric oxide within certain limits and it is also important to carry the accelerated ageing of the hydrous oxide to the point where further heating produces no perceptible change in the color of the product. Heretofore it has been suggested by others to precipitate hydrous ferric oxide from a ferric chloride solution and to heat the resulting precipitate. However there is no prior suggestion of which I am aware of controlling the precipitation and of also carrying the ageing to the extent, as herein illustrated, so as to secure a pigment product having the purity-dominant wave length characteristics as illustrated by the products shown as 1, 2 and 3 or by the other circles lying above the diagonal line in Figure 7 of the drawing. Neither is there any red iron oxide pigment product produced in accordance with any prior art suggestion of which I am aware which approximates such purity-dominant wave length characteristics, and especially in the higher range of dominant wave lengths.

I have discovered that, for the ultimate formation of uniform, spherical particles of red iron oxide by accelerated ageing of hydrous ferric oxide, this latter material must be precipitated in such a way that substantially uniform conditions, including a uniform concentration of ferric chloride, are maintained throughout the precipitation. I have also discovered that, contrary to the express teachings of prior art, the particle size and hence the shade of color of the finished pigment product is quite largely independent of the time and temperature employed in the ageing process. Instead, these properties are accurately controlled, in accordance with my discovery, by controlling the amount of free or unreacted ferric chloride remaining in the slurry after the precipitation of the hydrous ferric oxide, and also by continuing the ageing process to the point of constant color value.

The process of ageing, hereinbefore mentioned, involves the conversion of the slurry of precipitated hydrous ferric oxide to a slurry of the pigment product. Apparently, during this conversion water is liberated from some type of loose binding forces present in the hydrous oxide, and the resulting iron oxide coalesces in the form of substantially spherical particles which consequently must actually be agglomerates. The excess unreacted ferric chloride, which previously is tightly bound by the hydrous oxide, is also liberated during this step in the process. During ageing, it has been found that the oxide mass changes slowly to a reddish, less "muddy" appearance; during the last portion of the process, the mass rapidly clears up to a brilliant, clear red color as seen in the final pigment product. It is important that the ageing process be carried to the stage of constant color before washing and drying the pigment product.

These several conditions may be effectively fulfilled by adhering to certain procedural requirements, of which the following specific examples are illustrative. In these examples, the proportions are given as parts by weight unless otherwise stated.

*Example 1*

Whiting (finely divided calcium carbonate of high purity), 146.8 grams, analyzing 98.9% CaCO₃, was made into a slurry with 450 grams of water. To this suspension, vigorously stirred, was added 308 grams of a previously filtered 52% solution of ferric chloride. The solution was added at a constant rate through an orifice, and the addition required approximately 30 minutes. Both of the solutions were at normal room temperature (70-75° F.). The resulting slurry of hydrous ferric oxide was maintained at room temperature for approximately one hour with constant stirring, and was then transferred to an autoclave and heated under pressure at 170° C. (338° F.) for three hours with constant stirring. After cooling, the ferric oxide was removed on a filter, washed with fresh water until free of soluble salts (especially calcium chloride), and dried in an oven at 230° F. The dried cake was readily reduced to a free-flowing powder by gentle rubbing. The powder was a brilliant light orange red iron oxide pigment, and consisted of very small substantially spherical particles, as shown in the photomicrograph of Figure 1. By this procedure I secure a pigment product which is made up not merely to the extent of 80 or 95 percent, or so, of substantially spherical particles, but consists substantially completely of the substantially spherical particles.

Grinding the pigment into a suitably compounded linseed oil base produced a brilliant light orange red non-fading paint.

*Example 2*

This example exactly duplicated Example 1 except that the amount of whiting was reduced to 125.8 grams. The pigment yielded a paint of a dark maroon shade and of high color purity unobtainable with previously known iron oxide pigments. Figure 3 illustrates the type of pigment particles obtained.

*Example 3*

A red pigment, yielding a paint having a bright red color intermediate the colors produced with the pigments of Examples 1 and 2, resulted when 134.0 grams of whiting was substituted for the 146.8 grams employed in Example 1. This type of pigment is illustrated by Figure 2.

In the above method, the calcium carbonate slowly reacts with the slowly added ferric chloride, so that the concentration of unreacted ferric chloride remains substantially constant throughout the major part of the period of time required for precipitation and throughout all portions of the batch. The concentration of unreacted ferric chloride may undergo a progressive change for a relatively short period of time after completion of ferric chloride addition, but such concentration will then level off to a predetermined value, as occurs in the examples, in order to provide the desired color in the resulting pigment. The combination of intensive agitation, careful regulation of the rate at which the iron chloride is added, and use of a slowly reactive basic substance, in the procedure described, causes the iron chloride to become well distributed throughout the entire reaction mass before it is converted to the hydrous oxide. The rate of addition of the chloride is substantially equal to the rate at which it reacts with the base under the given conditions of temperature and concentration. If a much larger batch is made than is illustrated in the above examples, it is sometimes necessary to add the ferric chloride solution over a longer period of time so as to obtain substantially uniform distribution of ferric chloride solution in the slurry of whiting at any one time. After all of the calcium carbonate has been reacted, the controlled excess of ferric chloride remains well distributed throughout the mixture. At no time during the process does the concentration of iron chloride substantially exceed the value desired in the final mixture.

As indicated in the examples, the shade of color obtainable in my new pigment products varies from a brilliant light orange red to a dark maroon. The exact shade is determined by the percentage of unreacted iron chloride associated with the precipitated hydrous oxide. In general, this percentage of unreacted iron chloride is to be held within the approximate range of 2% to 20% of the amount reacted, the specific values shown in the three examples being 2.08, 19.1% and 11.8% respectively. The preferred range, where the concentration of solids is as shown in the examples, is from about 2% to about 15% excess ferric chloride.

While the presence of at least a slight excess of ferric chloride appears to be required for the proper ageing of the hydrous oxide, it has been found that much larger amounts of unreacted ferric chloride exert a retarding effect on this conversion. Accordingly, the darker shades require somewhat increased time of heating. Phosphate ion has a still greater effect than excess chloride in retarding the ageing and sulfate ion also produces undesirable effects; these ions are ordinarily to be avoided for best results in terms both of process and product.

The concentration of the calcium carbonate slurry and of the ferric chloride solution may be varied within quite wide limits, depending on economic conditions and on the solubility of the materials. A minimum of water in the mixture is advantageous in the recovery of the dry product, but too high a concentration either of solids or of dissolved material may cause stoppage of the agitators or plugging of equipment. Ferric chloride solutions of from 20% to 56% concentration have been used, with best results being obtained at 40–45%. The ferric chloride solution should be substantially free of ferrous ion, iron oxide, or other impurities and should therefore be processed in glass-lined or other non-corrosive and non-ferrous equipment.

Precipitation of the hydrous oxide at normal room temperature or even at reduced temperatures is preferred, since under those conditions pigments having a wide range of colors may be made. With increasing precipitation temperatures, it becomes increasingly difficult to make the darker maroon pigments. Thus, precipitations carried out at 130–190° F. resulted in light red or medium red pigment products, regardless of the amount of unreacted ferric chloride present during ageing. For similar reasons, precipitation with active alkalis, such as calcium hydroxide, which produces a considerable heating effect and rise in temperature, is found to be ineffective in commercial practice where high color purity is desired, and especially so in respect to pigments of the darker red or maroon shades.

Ageing of the hydrous oxide slurry to ferric oxide is effectively carried out in a minimum of time by heating in an autoclave under superatmospheric pressure and at a correspondingly elevated temperature. However, in contrast to the teachings of the prior art, I have found that substantially equally attractive pigment products may be produced by carrying out the ageing at atmospheric pressure, always providing that the process be carried to completion. Ageing of separate portions of a hydrous oxide, formed by neutralizing approximately 90% of the total ferric chloride, to substantially indistinguishable pigment products of high color purity, has been achieved, for example, by heating the slurry for 4–5 days at 212–220° F., for 2 hours at 320–340° F., or for one-half hour at 355–375° F. On the other hand, heating the slurry for 3 hours at 275° F. produced only a brownish-red, muddy product of very low color purity.

The pigment slurry recovered on completion of the ageing step ordinarily contains at least one pound of pigment in somewhat less than a gallon of slurry. After washing the pigment to the substantially chloride-free state and removing most of the water by filtering or by decantation, the damp pigment mass is dried at moderate temperature. Temperatures of 210–230° F. are preferred; substantially higher temperatures sometimes cause a darkening or muddying of the color, and caking of the mass. The pigment when properly dried can be easily broken apart by rubbing, and is easily dispersed in varnish or paint formulations. Where desired, small amounts of materials such as sodium stearate may be added to the wet pigment before drying, to provide surface-treated pigment particles having improved dispersing and non-settling characteristics when employed in paints and enamels.

My invention provides an improved inorganic pigment product characterized by spherical particles having a high degree of uniformity, i. e. a low particle size coefficient of variation. Presumably in consequence of these novel characteristics, my novel pigments are shown to provide an entirely new order of purity of color, when tested in accordance with the standard procedures hereinabove identified.

What I claim is:

1. The method of making a red iron oxide pigment product having a high degree of color purity and composed predominantly of non-angular particles as viewed at a magnification of 1200, said method comprising: adding a solution of ferric chloride to a slurry of finely divided calcium carbonate with agitation at constant temperature and at a substantially constant rate to maintain a substantially constant concentration of unreacted ferric chloride, the total amount of ferric chloride being within the range of about 2–20% in excess of the amount required for complete reaction with the calcium carbonate; heating the resulting slurry of hydrous ferric oxide until the color of the resulting pigment product is unchanged on further heating; and separating, washing and drying the pigment product.

2. A red iron oxide pigment product having a high degree of color purity and composed predominantly of non-angular particles as viewed at a magnification of 1200, said product being produced by the method comprising: adding a solution of ferric chloride to a slurry of finely divided calcium carbonate with agitation at constant temperature and at a substantially constant rate to maintain a substantially constant concentration of unreacted ferric chloride, the total amount of ferric chloride being within the range of about 2–20% in excess of the amount required for complete reaction with the calcium carbonate; heating the resulting slurry of hydrous ferric oxide until the color of the resulting pigment product is unchanged on further heating; and separating, washing and drying the pigment product.

3. A red iron oxide pigment product composed of a large preponderance by weight of non-angular particles as viewed at a magnification of 1200, and having a color purity of not less than about 0.1 and at least equal to the value of P in the expression $$P = 12.585 - .02W$$

where W is the dominant wavelength in millimicrons, and having a particle size variation C not greater than about 25, where $$C = \frac{\sigma}{D} \times 100$$

$$\sigma = \sqrt{\frac{\Sigma nv^2}{\Sigma n}} \times \frac{1}{10} \text{ (microns)}$$

$$D = \frac{\Sigma ns}{\Sigma n} \times \frac{1}{10} \text{ (microns)}$$

$$V = 10D - s$$

$n$ = frequency of occurrence and $$s = \frac{\text{measured effective diameter in millimeters}}{\text{measured at a magnification of 10,000}}$$

said pigment product being produced in accordance with the method comprising: adding a solution of ferric chloride to a slurry of finely divided calcium carbonate with agitation at constant temperature and at a substantially constant rate to maintain a substantially constant concentration of unreacted ferric chloride, the total amount of ferric chloride being within the range of about 2–20% in excess of the amount required for complete reaction with the calcium carbonate; heating the resulting slurry of hydrous ferric oxide until the color of the resulting pigment product is unchanged on further heating; and separating, washing and drying the pigment product.

4. The method of making a red iron oxide pigment product having a high degree of color purity and composed predominantly of non-angular particles as viewed at a magnification of 1200, said method comprising: forming an aqueous slurry of hydrous ferric oxide of uniform small particles in the presence of a substantially constant small controlled excess of free, unreacted ferric salt of a monovalent anion; heating said slurry in the presence of said small controlled excess of free, unreacted ferric salt of a monovalent anion, said heating being continued until the color of the resulting pigment product is unchanged on further heating; and separating, washing, and drying the pigment product.

5. A red iron oxide pigment product having a high degree of color purity and composed predominantly of non-angular particles as viewed at a magnification of 1200, said product being produced by the method comprising: forming an aqueous slurry of hydrous ferric oxide of uniform small particles in the presence of a substantially constant small controlled excess of free, unreacted ferric salt of a monovalent anion; heating said slurry in the presence of said small controlled excess of free, unreacted ferric salt of a monovalent anion, said heating being continued until the color of the resulting pigment product is unchanged on further heating; and separating, washing, and drying the pigment product.

6. A red iron oxide pigment product composed of a large preponderance of weight of non-angular particles as viewed at a magnification of 1200, and having a color purity of not less than about 0.1 and at least equal to the value of P in the expression $$P = 12.585 - .02W$$

where W is the dominant wavelength in millimicrons, and having a particle size variation C not greater than about 25, where $$C = \frac{\sigma}{D} \times 100$$

$$\sigma = \sqrt{\frac{\Sigma nv^2}{\Sigma n}} \times \frac{1}{10} \text{ (microns)}$$

$$D = \frac{\Sigma ns}{\Sigma n} \times \frac{1}{10} \text{ (microns)}$$

$$V = 10D - s$$

$n$ = frequency of occurrence and $$s = \frac{\text{measured effective diameter in millimeters}}{\text{measured at a magnification of 10,000}}$$

said pigment product being produced in accordance with the method comprising: forming an aqueous slurry of hydrous ferric oxide of uniform small particles in the presence of a substantially constant small controlled excess of free, unreacted ferric salt of a monovalent anion; heating said slurry in the presence of said small controlled excess of free, unreacted ferric salt of a monovalent anion, said heating being continued until the color of the resulting pigment product is unchanged on further heating; and separating, washing, and drying the pigment product.

7. The method of making a red iron oxide pigment product having a high degree of color purity and composed predominantly of non-angular particles as viewed at a magnification of 1200, said method comprising: forming an aqueous slurry of hydrous ferric oxide of uniform small particles under conditions of substantially constant temperature, substantially constant agitation and substantially constant concentration of reactants in solution in the presence of a small controlled excess of free, unreacted ferric salt of a monovalent anion, the iron content of said slurry in the form of said salt being in an amount within the range of about 2–20% of the iron content in the form of said oxide; heating said slurry in the presence of said small controlled excess of free, unreacted ferric salt of a monovalent anion, said heating being continued until the color of the resulting pigment product is unchanged on further heating; and separating, washing, and drying the pigment product.

8. A red iron oxide pigment product having a high degree of color purity and composed predominantly of non-angular particles as viewed at a magnification of 1200, said product being produced by the method comprising: forming an aqueous slurry of hydrous ferric oxide of uniform small particles under conditions of substantially constant temperature, substantially constant agitation and substantially constant concentration of reactants in solution in the presence of a small controlled excess of free, unreacted ferric salt of a monovalent anion, the iron content of said slurry in the form of said salt being in an amount within the range of about 2–20% of the iron content in the form of said oxide; heating said slurry in the presence of said small controlled excess of free, unreacted ferric salt of a monovalent anion, said heating being continued until the color of the resulting pigment product is unchanged on further heating; and separating, washing, and drying the pigment product.

9. A red iron oxide pigment product composed of a large preponderance by weight of non-angular particles as viewed at a magnification of 1200, and having a color purity of not less than about 0.1 and at least equal to the value of P in the expression $$P = 12.585 - .02W$$

where W is the dominant wavelength in millimicrons, and having a particle size variation C not greater than about 25, where $$C = \frac{\sigma}{D} \times 100$$

$$\sigma = \sqrt{\frac{\Sigma nv^2}{\Sigma n}} \times \frac{1}{10} \text{ (microns)}$$

$$D = \frac{\Sigma ns}{\Sigma n} \times \frac{1}{10} \text{ (microns)}$$

$$V = 10D - s$$

$n$ = frequency of occurrence and $$s = \frac{\text{measured effective diameter in millimeters}}{\text{measured at a magnification of 10,000}}$$

said pigment product being produced in accordance with the method comprising: forming an aqueous slurry of hydrous ferric oxide of uniform small particles under conditions of substantially constant temperature, substantially constant agitation and substantially constant concentration of reactants in solution in the presence of a small controlled excess of free, unreacted ferric salt of a monovalent anion, the iron content of said slurry in the form of said salt being in an amount within the range of about 2–20% of the iron content in the form of said oxide; heating said slurry in the presence of said small controlled excess of free, unreacted ferric salt of a monovalent anion, said heating being continued until the color of the resulting pigment product is unchanged on further heating; and separating, washing, and drying the pigment product.

GEORGE E. NOPONEN.

References Cited in the file of this patent

UNITED STATES PATENTS

| Number | Name | Date |
|---|---|---|
| 1,510,445 | Wilson | June 2, 1925 |
| 2,335,760 | Hucks | Nov. 30, 1943 |
| 2,365,720 | Neighbors | Dec. 26, 1944 |
| 2,374,454 | Oliver | Apr. 24, 1945 |
| 2,452,608 | Smith | Nov. 2, 1948 |

FOREIGN PATENTS

| Number | Country | Date |
|---|---|---|
| 298,926 | Great Britain | Oct. 15, 1928 |
| 300,233 | Great Britain | Nov. 9, 1928 |
| 313,999 | Great Britain | June 21, 1929 |
| 385,646 | Great Britain | Jan. 5, 1933 |
| 433,333 | Great Britain | Aug. 13, 1935 |

OTHER REFERENCES

Mellor: "Comprehensive Treatise on Inorganic and Theoretical Chemistry," vol. 13, page 838, Longmans, Green and Co., N. Y. C., 1934.

Schofield: "Paint Manufacturer," vol. 17, No. 6, pages 181–184, June 1947.